United States Patent [19]

Nishijima

[11] Patent Number: 5,894,026

[45] Date of Patent: Apr. 13, 1999

[54] METHOD OF MAKING A FOOD COMPOSITE COMPRISING HERRING EGGS

[75] Inventor: Hideo Nishijima, Brossard, Canada

[73] Assignee: Tomil Foods Ltd., Brossard, Canada

[21] Appl. No.: 08/806,888

[22] Filed: Feb. 25, 1997

[30] Foreign Application Priority Data

May 17, 1996 [CA] Canada ................................. 2176912
Feb. 21, 1997 [CA] Canada ................................. 2198172

[51] Int. Cl.$^6$ .......................... A23B 4/00; A23C 19/00
[52] U.S. Cl. .......................... 426/92; 426/272; 426/274; 426/615; 426/643
[58] Field of Search .......................... 426/272, 92, 274, 426/643, 615

[56] References Cited

U.S. PATENT DOCUMENTS

| 7,895 | 1/1851 | Westacott. | |
|---|---|---|---|
| 3,914,422 | 10/1975 | Chen | 426/248 |
| 4,181,739 | 1/1980 | Santo | 426/272 |
| 4,447,476 | 5/1984 | Kagawa et al. | 426/262 |
| 5,464,648 | 11/1995 | Nishijima | 426/643 |
| 5,510,133 | 4/1996 | Yamamoto | 426/643 |

FOREIGN PATENT DOCUMENTS

| 999477 | 11/1976 | Canada. |
|---|---|---|
| 1099142 | 4/1981 | Canada. |
| 1174512 | 9/1984 | Canada. |
| 2620308 | 3/1989 | France. |
| 58-179465 | 10/1983 | Japan. |
| 59-45827 | 3/1984 | Japan. |
| 60-78532 | 5/1985 | Japan. |
| 60-91937 | 5/1985 | Japan. |
| 3-83561 | 4/1991 | Japan. |
| 2284531 | 6/1995 | United Kingdom. |

OTHER PUBLICATIONS

Patent Abstracts of Japan, Abs. Grp No: C603, vol. 13, No. 238 for Japan Application 62–207261. Inventor: Ishige, Jun. 5, 1989.
Database Abstract, AN 95–370452 [48] WPIDS for JP 07250655. Patent Applicant: Harada, Oct. 1995.
U.S. Ser. No. 213,563, Vucassovich, filed Sep. 1921.

*Primary Examiner*—Anthony J. Weier
*Attorney, Agent, or Firm*—Ronald S. Kosie; Robert Brouillette

[57] ABSTRACT

A composite food substance having an adhesion enhanced seafood substrate and washed herring eggs adhered to a surface of the substrate. The seafood substrate may be kelp.

27 Claims, No Drawings

METHOD OF MAKING A FOOD COMPOSITE COMPRISING HERRING EGGS

The present invention relates to a composite food substance made using loose washed cohesive herring eggs such as for example, the loose eggs of the (North) Atlantic herring (*Clupea harengus*).

Although the following description will deal particularly with a food composite substance comprising kelp in addition to herring eggs, the kelp may be replaced by another suitably treated seafood item such as, for example, the flesh of crustaceans, molluscs (i.e. shellfish), and more particularly such as for example the flesh of scallops, crabs, lobsters, mussels, whelk (i.e. sea snails), etc. As detailed herein, an adequate artificial (e.g. manual) fixation of herring eggs to kelp has heretofore proved an illusive goal. Similarly, the fixation of herring eggs to other seafood items such as mentioned above has also been inadequate.

The constant element of the food composite of the present invention is herring eggs. Herring can be found in cold northerly waters, such as those of the Pacific ocean, the Atlantic ocean, the Bering sea, the Baltic sea, the Irish sea, Barents sea, the sea of Japan, the Okhotsk sea, the Yellow sea, the East china sea, the Norwegian sea, the North sea, the Korean sea and the East Siberian sea. Thus, for example, herring is caught in the North Pacific area along the west coasts of the United States and Canada; herring is also caught in the North Atlantic area along the east coasts of the United States and Canada, such as for example off the coast of the New England states and the Maritime provinces of eastern Canada (e.g. Newfoundland).

KELP ROE or HERRING ROE ON KELP is a much appreciated ocean food item in Japan. The natural food item comprises a layer of kelp to which herring eggs are affixed, e.g. a layer of herring eggs attached to a layer of kelp. At present, the source of this food item is the oceans from which it is harvested. The natural product is produced during the herring spawning season. During herring spawning, herring eggs fall onto the kelp leaf or frond and naturally stick to the kelp; the mechanism by which this sticking occurs is not generally understood. The coasts off of British Columbia (Canada) and Alaska (U.S.A.) are major harvesting areas for this type of food item.

The harvesting of KELP ROE from the oceans, as with all fisheries, is problematic since the presence of the food item during any season is totally at the mercy of the natural behavior of herring schools as well as the presence of the kelp. Accordingly, the supply may be high one year and low the next. Such fluctuations in supply can thus lead to a supply shortage, resulting in a high price in the marketplace. Irrespective of the quantity of any years harvest, the quality of the naturally produced food item may also vary from time to time and from place to place. For example, there may not always be a layer of eggs on both sides of the kelp leaf or frond; both sides of the kelp may have different egg layer thicknesses; the layer of eggs on any one side of the kelp may not be uniform or sufficiently thick. Additionally, for example, a layer of eggs on the kelp may be mixed with so much sand as to render the item unfit for human consumption.

It is, for example, known to cohere together loose herring eggs; see for example, Canadian patent no. 1,099,142 and U.S. Pat. No. 5,464,648 which teach methods of processing loose eggs of herring into a coherent or cohesive product.

Attempts have also been made to artificially or manually produce KELP ROE, i.e. to make a man made KELP ROE. An underlying problem encountered with respect to such man-made food is how to get the herring eggs to stick to the kelp layer (i.e. on a commercial basis) without using any artificial adhesive agent. The presence of an artificial adhesive agent could interfere with not only with the taste of the product but also with the product appearance; at a low temperature (e.g. −10° C. or lower) the presence of an artificial adhesive agent may lead to separation of the eggs from the underlying food substrate.

As mentioned above similar adherence problems apply to the combining of herring eggs with the flesh of other seafood items such as those mentioned above.

Accordingly, it would in general be advantageous to have a means for producing a man made sea food composite item using loose herring eggs without having to resort to adhesive materials.

It more particularly would be advantageous to have a means for producing a man made KELP ROE food item which may have a natural appearance and taste. It would be advantageous to have a means for producing KELP ROE without the need for adding an artificial adhesive for sticking the herring eggs to the kelp. It would also be advantageous to be able to vary the thickness of a herring egg layer on a piece of kelp as well as being able to impart a natural look to the disposition of the herring eggs on kelp. It would further be advantageous to be able to exploit loose herring eggs for the preparation of a KELP ROE food. It would be further advantageous to be able to exploit pre-frozen herring eggs such that the KELP ROE food item may be produced during the herring fishing off season so as to be able to occupy herring fishing plants.

Thus the present invention generally provides a composite food substance comprising an adhesion enhanced seafood item (e.g. substrate) and saline washed herring eggs adhered to a surface of the seafood item. The seafood item (e.g. substrate) may be obtained from a raw initial seafood item (e.g. substrate) treated (e.g. to remove slime from the surface thereof) in any suitable way so as to enhance the adhesion of the herring eggs thereto. The seafood item (e.g. substrate) may comprise or be an item as mentioned above (e.g. kelp, scallop flesh, whelk flesh, etc.).

The present invention in particular provides a composite food substance comprising a layer of an adhesion enhanced kelp (e.g. a sheet/strip thereof) and saline washed herring eggs adhered to a surface of the kelp. The adhesion enhanced kelp may have been obtained from a (raw) pliant kelp treated (e.g. to remove slime from the surface thereof) in any suitable fashion so as to enhance the adhesion of the herring eggs thereto.

The present invention in another aspect provides a process for treating a sea food item (e.g. having a slimy surface, etc . . . ) to obtain an adhesion enhanced sea food item comprising contacting the raw seafood item (e.g. a seafood item having a slimy surface) with an adhesion enhancing liquid (e.g. an aqueous de-sliming liquid) for a time sufficient so as obtain a treated seafood item having an enhanced capacity for the adherence of saline washed loose cohesive herring eggs to the surface thereof. The seafood item may comprise or be an item as mentioned above (e.g. kelp, scallop flesh, whelk flesh, etc . . . ).

The adhesion enhancing liquid may comprise any suitable liquid (including any suitable or desired activation component or components) whereby the liquid may be used to treat a seafood item to provide the seafood item with an enhanced cohesion capacity for the fixation or cohesion of herring eggs to the seafood item (e.g. kelp). The liquid in order to be an adhesion enhancing liquid should not contain any substances which may undesirably effect the cohesion of herring eggs to the seafood item (e.g. kelp). The adhesion enhancing liquid may for example be an aqueous de-sliming liquid for the removal of slime from the surface of the seafood item (e.g. kelp). The de-sliming liquid may, for example, be an aqueous liquid which comprises fresh water; it may for example comprise seawater; etc. The de-sliming liquid may for example comprise boiling water (e.g. boiling freshwater, boiling seawater, etc . . . ); the boiling water, for example, being used to blanch the meat type seafood items, for a few seconds, so as to enhance the adhesion of herring eggs thereto.

The seafood item (e.g substrate) may comprise or be an item as described above, namely for example kelp, scallop flesh, clam flesh, whelk flesh, etc.

As mentioned above, the seafood item may in particular be kelp. Thus, the present invention in a further particular aspect provides a process for treating kelp to obtain an adhesion enhanced kelp comprising contacting pliant kelp having a slimy surface with an adhesion enhancing liquid for a time sufficient so as to obtain a treated kelp having an enhanced capacity for the adherence of saline washed loose cohesive herring eggs to the surface thereof.

The adhesion enhanced seafood item (e.g. kelp) obtained by the process as generally outlined above may be used to prepare a composite food substance as described herein.

Thus the present invention in accordance with another aspect provides a process for the preparation of a composite food substance comprising an adhesion enhanced seafood item (e.g. substrate) and saline washed herring eggs adhered to a surface of the seafood item (e.g. substrate), comprising contacting wet (e.g. drained), saline washed, loose, cohesive herring eggs with a wet surface of an adhesion enhanced seafood item having an enhanced capacity (i.e. relative to the raw seafood item) to adhere to said herring eggs so as to obtain a seafood/egg combination and subjecting the obtained seafood/egg combination to a cohesion step comprising maintaining the herring eggs in contact with the seafood item, while exposing the herring eggs to air, for a time period sufficient to obtain adherence of said eggs to said seafood item.

The present invention in accordance with another particular aspect relates to a process for the preparation of a kelp/egg composite food substance. Thus the present invention also provides a process for the preparation of a composite food substance comprising a layer of an adhesion enhanced kelp (e.g. sheet, strip or the like) and saline washed herring eggs adhered to a surface of the kelp, comprising contacting wet (e.g. drained), so line washed, loose, cohesive herring eggs with a wet surface of a layer of an adhesion enhanced pliant kelp having an enhanced capacity (i.e. relative to raw kelp) to adhere to said herring eggs so as to obtain a kelp/egg combination and subjecting the obtained kelp/egg combination to a cohesion step comprising maintaining the herring eggs in contact with the kelp, while exposing the herring eggs to air, for a time period sufficient to obtain adherence of said eggs to said kelp.

In accordance with the present invention, the process for the preparation of the composite food substance may comprise a saline washing step for treating unwashed loose herring eggs to obtain said loose cohesive herring eggs, said saline washing step comprising contacting loose unwashed herring eggs with an aqueous washing saline solution comprising sodium chloride so as to obtain washed washed loose cohesive herring eggs, said sodium chloride being present in the washing saline solution at a concentration of from 1% to 6% by weight. In accordance with the present invention, the saline washing step may comprise one or more saline washing stages wherein for each saline washing stage loose herring eggs are washed with said washing saline solution; for example,the washing step may comprise up to three saline washing stages.

In accordance with the present invention, the seafood item (e.g. kelp) and the herring eggs, as obtained from the cohesion step, may be passed on to a curing step for the curing of the eggs adhered to the seafood item, said curing step comprising soaking the seafood item and herring eggs adhered thereto in an aqueous saline solution saturated with sodium chloride, for a time period sufficient to obtain cured herring eggs, adhering to said seafood item. In accordance with the present invention, the curing step may, if desired, comprises one or more intermediate curing stages prior to soaking the kelp and herring eggs with said saturated saline solution, said one or more intermediate curing stages each comprising soaking the kelp and herring eggs adhered thereto in an unsaturated aqueous saline solution comprising sodium chloride at a concentration of at least 2% by weight.

In accordance with the present invention, the process for the preparation of the composite food substance may comprise, prior to the above mentioned saline washing step, a quick freezing step wherein unwashed herring eggs are brought to a freezing temperature of minus 30° C. or lower (e.g. a temperature of –40° C. or lower, e.g. a temperature of from –30° C. to –60° C..), the frozen eggs being defrosted prior to being subjected to the saline washing step.

The rest of the present description will deal mainly with a kelp/egg composite food substance (e.g. the preparation of KELP ROE) but it is to be understood that the outlined procedures apply in analogous fashion to other seafood items in addition to kelp such as the other seafood items mentioned above.

The loose cohesive herring eggs may be applied to a suitable kelp such that the eggs are essentially only in contact with the kelp and not each other (i.e. the eggs are spread apart on the surface of the kelp). More usually, however, a plurality of eggs will be applied to the surface of the kelp so as to not only be in contact with the kelp but also to be in contact with each other such that the eggs, as a result of the process described herein, will bind to the kelp and to each other; in this case the eggs may, for example, be applied to the kelp so that the eggs are piled up onto each other so as to define an egg layer which may be of desired thickness.

If desired a herring egg layer may first be adhered to one side of the kelp; the kelp/egg combination may then be turned over for the application of a herring egg layer to the other side of the kelp, i.e. to obtain a sort of herring egg and kelp sandwich wherein the kelp is sandwiched between two herring egg layers. Once the herring eggs are cohered to the kelp the combination may, for example, be subjected to a curing treatment wherein the combination is soaked in a brine or salt saturated solution to cure the eggs; this treatment can increase the adhesion of the eggs to the surface of the kelp as well as curing the eggs.

It is to be understood herein that the percentage concentration of salt is given in terms of a percentage by weight of salt (i.e. NaCl) relative to the weight of the solution.

It is also to be understood herein that in reference to saline washed herring eggs, the expression "loose cohesive herring eggs" refers to loose herring eggs whose natural cohesive capacity (i.e. stickiness capacity or bondability capacity) for adhering to an adhesion enhanced seafood item as well as to themselves, is more or less intact after a saline wash as described herein.

The loose cohesive herring eggs which are adhered to the kelp are obtained from a (manual) process wherein they are washed using only a saline solution such as for example seawater; the washing is of course carried out so as to as to avoid unduly impairing the cohesive character of the washed loose herring eggs (i.e. to avoid impairing the stickability or bondability of the loose herring eggs to the adhesion enhanced seafood item and to themselves). This processing method may be applied to any mature herring eggs harvested anywhere but especially to Atlantic herring eggs caught on the East coast of Canada and U.S.A.

The loose (mature) herring eggs may be obtained by slitting the bellies of suitable female Atlantic herring and collecting the ovaries therefrom or collecting the whole and/or broken ovaries obtained in the course of filleting the whole female herring. The ovaries may be processed to obtain loose eggs by either use of a mechanical mincer or by rubbing the ovaries manually over a wire mesh screen (see below).

The fresh unwashed herring eggs may be immediately washed with a saline solution as described herein to obtain washed loose cohesive herring eggs.

Alternatively, fresh loose unwashed eggs can, if desired, be quick pre-frozen, advantageously at −30° or lower (e.g. at −30° C. to −80° C. e.g. at −40° C. to −60° C.), by a plate (contact) freezer prior to the saline washing process; i.e. the eggs may be so frozen provided that they are frozen in an unwashed state. The eggs may be frozen within a period of 5 hours or less (e.g. 2 to 5 hours, e.g. 3 hours). A freezer such as a blast freezer should be avoided; it does not work well. The herring eggs may be frozen from a loose state or as eggs still contained within the ovarial membrane; if the eggs are within an intact ovarial membrane the outer surface of the membrane may be washed (i.e. lightly), provided that the eggs within the membrane sack are not essentially affected by such a wash.

It is to be understood herein that a quick freezing step is a freezing step which will bring (fresh) unwashed herring eggs to a temperature of −30° C. or lower in a relatively short period of time. Since the herring eggs are relatively oily, a quick deep freezing to a temperature of −30° C. or less is needed in order to preserve the desired palatable characteristics of the eggs. The eggs may, for example, be frozen in a quick, sharp or shock manner, to said deep freeze temperature in less than 3 to 4 hours. Herring eggs may, for example, be deep frozen using a plate or contact freezer manufactured by APV Parafregze, Thetford, England under model MC # 4239; any suitable type of freezer capable of quick freezing the herring eggs may of course be used (e.g. an ammonia based freezer, a $CO_2$ based freezer, a freon based freezer, a nitrogen based freezer and the like). However, as mentioned above, a blast freezer should be avoided; it is not suitable due to its blasting action.

The quick frozen eggs may be stored at a temperature of about −18° C. or lower (e.g. −20° C. or lower) for a period of up to 2 to 3 years provided that prior to storage they are ice glazed after deep freezing and are poly wrapped with a suitable plastic sheet or film to exclude oxygen and inhibit dehydration; glazing may be accomplished by dipping deep frozen eggs into cold water so as to form an ice film about the frozen eggs mass.

By exploiting such a freezing step, it would not be necessary to rush to process, as soon as possible, all of the fresh (mature) eggs made available during the fishing season; such seasonal processing would require a relatively large processing facility to handle the large quantity or volume of eggs made available in a relatively short period of time. In accordance with this particular aspect of the present invention a large quantity of eggs may be stored in a frozen state and be processed, as desired or required, by a relatively smaller plant which may spread the processing over a longer period of time so as to facilitate control of the quality of the finished product.

Suitable, frozen unwashed herring eggs (i.e. frozen herring eggs which were in a loose state prior to being frozen together) may be defrosted in an environment having a temperature greater than 0 degrees celsius and less than 20 degrees celsius (e.g. at about 5 to 20 degrees celsius, e.g. at about 10 to 15 degrees celsius, e.g. at about 10 degrees celsius). The eggs may for example be defrosted over a time period of, for example, from about 15 to 24 hours, at a room temperature of about 10 to 13 degrees celsius (e.g. 10 degrees) until they are again loose (e.g. in a semi-defrosted state at minus 5° to minus 1° C.). During defrosting the eggs should be protected from contact with air so as to prevent dehydration (e.g. the eggs may be defrosted while being covered with a suitable plastic sheet material). The defrosted eggs at about minus 5° to plus 5° C. (e.g. at about, −5° to −1° C., e.g. at about minus 1° to 5 degree celsius, e.g. at about −1° C. to 3° C., e.g. at about −1 degree celsius, e.g. at about 1 degree celsius) may be passed on to a salt water washing treatment as explained herein.

If the defrosted eggs are still in the ovarian membrane they may be defrosted in analogous fashion. However, if the defrosted eggs are still in the ovarian membrane it will be necessary to extract the eggs from the membrane once the eggs have been defrosted; this may be accomplished by any suitable means such as by use of a mechanical mincer (e.g. a Bone separator Baader model 694, by Baader GmbH, Germany) or by rubbing the ovaries manually over a wire mesh of suitable screen size (e.g. first with a 6 mm size screen followed by screening over a 1.5 mm mesh size) to separate the eggs from the membrane.

Care should be taken to avoid washing the loose eggs with fresh water (e.g. prior to their being frozen). If the herring eggs are freshwater washed their self-cohesive character may be significantly reduced to the point that they may essentially lose their cohesive character or at the very least they may take too long a relative time to gel together and to stick to the kelp for processing purposes.

Unwashed, loose mature herring eggs either fresh or defrosted are subjected to a saline washing step or process wherein the eggs are washed, one or more times, by a saline solution or liquid which advantageously may be, for example, seawater or an aqueous salt solution having a similar salt concentration, i.e. a salt concentration of about 3%.

In accordance with the present invention, an aqueous saline wash solution may, for example, comprise sodium chloride (i.e. herein sometimes generally referred to by the common name "salt") at a concentration which is in the range of about 1% to about 6% of sodium chloride, e.g. about 3% to about 4% by weight of sodium chloride.

The herring eggs may, for example, be saline washed at a temperature of 15 degrees Celsius or less, e.g. at a temperature in the range of from 2° C. to 15° C. The saline wash solution may, for example, be used at a temperature for example of 15 degrees Celsius or less, e.g. a temperature of from 2 to 10 degrees Celsius, e.g. 0 to 5 degrees Celsius, e.g. 3 to 5 degrees Celsius, e.g. 0 to 3 degrees Celsius. The room temperature may, for example, be from about 5° to 20° C., e.g. from about 10° to 15° C.

In accordance with the present invention, a saline washing step may, for example, generally comprise contacting a mass of unwashed herring eggs with an aqueous saline solution comprising sodium chloride so as to obtain an aqueous mixture comprising a first upper aqueous saline layer and a second lower aqueous saline layer, said second aqueous saline layer comprising a mass of washed herring eggs (e.g. loose eggs).

The saline washing step may comprise a single wash stage as defined above, provided that the amount of foreign matter associated with the eggs (e.g. blood, immature eggs, etc) may be effectively removed thereby.

Thus, for example, loose unwashed herring eggs may be washed as follows:

a) loose unwashed herring eggs are contacted in a container with a suitable amount of saline solution (i.e. the quantity of saline solution may be predetermined by taking sample amounts of eggs and mixing each sample with a different given amount of solution and thereafter using the ratio of eggs to solution which gives the desired or necessary cleaning results while maintaining the cohesive character of the eggs);

b) the mixture of herring eggs and saline solution is stirred or agitated (e.g. manually using a person's hand, by a stirring stick or by a bubbling system using a hose set at the bottom of the container) sufficiently to cause the eggs to be dispersed in the solution but not so strongly so as to unduly damage the eggs (e.g. for about 20 seconds or less, e.g. 5 to 10 seconds or less); and c) thereafter the mixture is allowed to stand, for from about 1 to 2 minutes, so as to allow herring eggs to settle to the bottom of the container and obtain an aqueous mixture comprising an upper aqueous saline layer (e.g. containing blood, scale, etc.) and a lower aqueous saline layer comprising a mass of washed (e.g. loose) herring eggs which are thereafter separated in a suitable fashion so as to leave behind an aqueous layer comprising a mass of loose washed herring eggs.

The wash container (e.g. a rectangular container) for the above, may be sized in accordance with the amount of eggs it is desired to wash such that, the eggs in step c) above, may settle into a suitable mass of washed loose eggs.

More particularly, in accordance with the present invention, the saline washing step may comprise a first washing stage and one or more subsequent washing stages, said subsequent washing stages including at least a final washing stage, each said washing stage comprising contacting a mass of loose herring eggs with an aqueous saline solution comprising sodium chloride so as to obtain an aqueous mixture comprising a first upper aqueous saline layer and a second lower aqueous saline layer, said second aqueous saline layer comprising a mass of washed herring eggs (e.g. loose eggs), and separating said first layer from said second layer, each subsequent washing stage treating the herring eggs of the second layer of a prior washing stage, said first washing stage comprising contacting a mass of loose unwashed herring eggs with said aqueous saline solution, the herring eggs of the second layer of a final washing stage being passed on to be applied to the surface of kelp before a cohesion step; and preferably, the sodium chloride concentration of the aqueous saline solution, for each washing stage, is at least substantially the same but may, if desired, be different (e.g. the aqueous saline solution for each of the stages may be seawater).

It is to be understood herein that the expression "at least substantially the same" in relation to the salt concentrations of any two or more wash stages, means a salt concentration which is, for all practical purposes, the same for all of the specified wash stages.

The loose washed cohesive eggs obtained from the saline washing step (e.g. from the above mentioned final washing stage) may then be adhered to kelp as described herein. The loose cohesive eggs once so washed start to cohere together in a short period of time especially in the presence of air; accordingly the loose wet eggs from which the saline solution has been drained should be brought into contact with the kelp in a relatively short period of time (e.g. within about 5 to ten minutes after the final washing stage).

In accordance with the present invention, an above described washing stage may include separating the upper layer from the lower layer, for example, by decantation, by being (gently) poured out of the container from its top opening.

As may be understood sufficient washing liquid is used such that once the stirring is stopped the lower and upper layers may be formed in the container. The washed clean eggs will tend to settle into the lower layer, whereas dirty foreign objects including blood, immature eggs, scales, belly membrane and the like will tend to float in the upper layer. If a transparent container is used, it will be seen that the upper layer will tend to have a reddish color whereas the lower layer containing the washed loose mature eggs will tend to have a yellow color. The upper layer of reddish solution may be removed, for example, by decantation by pouring the upper layer (gently) out of the container so as to leave the lower layer comprising washed wet eggs behind in the container. The first decantation will end the 1st washing. If additional washing is necessary, additional washing liquid is added to the liquid and eggs in the container. The amount of liquid added is sufficient such that once stirring is stopped the contents of the container can again settle out into the above mentioned upper and lower layers. The upper layer is again decanted to end the second wash.

The total number of washings is dependent on how dirty (e.g. bloody) the loose eggs are as well as on how much wash liquid is used in relation to any given weight or amount of eggs. Care should be taken not to overwash the eggs since this may undesirably reduce the cohesive character of the washed loose eggs. It has, for example, been found that two or three washing (e.g. with seawater) may be sufficient to obtain clean eggs which have the desired or acceptable cohesive character. For example, a washing treatment may be carried out wherein the amount of eggs is about 4.5 kg, the total volume of wash liquid for each wash is about 7 to 8 liters, there is a decantation of about 6 liters for each wash stage and a corresponding new water addition for each subsequent wash stage before the final wash stage. In this latter case, it has been noted that if the eggs are subjected to further washing beyond a third wash that the cohesive character of the eggs deteriorates, i.e. an unsatisfactory adhesion of the eggs to the kelp occurs. In any event, the appropriate amount of washing stages, washing solution, etc, may, in any particular case, be predetermined by experiment with a portion of the herring eggs to be washed.

The washing liquid for any saline washing stage is, as mentioned above, a saline wash liquid. The saline wash liquid for a wash stage may, for example, as mentioned above, be a saline solution comprising 1 to 6% by weight salt. Advantageously, the wash liquid may, as also mentioned above, be seawater. In any case the wash liquid should not contain any substances which may undesirably effect the cohesive character of the washed eggs. It has been noted for example that the presence of sodium hypochlorite in a saline wash solution such as seawater has a deleterious effect on the cohesive character of the washed eggs, i.e. cohesion to kelp is reduced.

The kelp which may be used in accordance with the present invention may be any suitable broad fronded kelp which is a member of the family Laminariacae; members of the family Fucaceae may also possibly be used but the broad fronded members of the family Laminariacae are preferred. The kelp may for example be *Laminaria japonica or as locally known in the far east in the area around Korea and Japan respectively as DASHIMA and KONBU.*

The kelp to be treated for an increase in adhesion capacity may be fresh kelp, kelp reconstituted from dried kelp or salted kelp; the kelp to be treated is pliant with a slimy surface. In any case the obtained treated kelp is pliant, i.e. the eggs may be attached to the obtained pliant kelp.

Cohesive herring eggs cannot be to made to adequately attach to kelp having a slimy surface. It is believed that the low or unacceptable adhesion to the kelp surface is due to the presence of slimy substances such as aliginates or fucoidin. It has been surprisingly found that the adherence of the cohesive herring eggs to kelp may be enhanced by treating the kelp having a slimy surface with an adhesion enhancing liquid (e.g. an aqueous de-sliming liquid) at a temperature and for a time sufficient (e.g. to remove slime from the surface thereof) so as obtain a treated kelp having an enhanced capacity for the adherence of washed cohesive herring eggs to the surface thereof. The de-sliming liquid may, for example, comprise freshwater or seawater. However, the de-sliming liquid should not contain any substances which may undesirably effect the cohesive character of the washed eggs. It has been noted for example that the presence of sodium hypochlorite is deleterious.

The kelp may for example be blanched by being contacted with freshwater or seawater at boiling temperature for a suitable time period, such as for example a time period of 3 minutes or less (e.g. 2 to 3 minutes). Care should be taken not to over cook the kelp since the purpose of the blanching is to enhance the adhesion of the eggs to the kelp, e.g. a blanching period of, for example, 10 minutes or more may adversly effect the ability of the kelp to stick to the eggs. Temperatures lower than boiling (e.g. 50 to 100 degrees Celsius, e.g. 80 to 90 degrees) may be used but may require a longer contact time to achieve an acceptable adhesion enhancement; adhesion enhancement has been found to be adequate if boiling water is used. Any other liquid capable of producing an enhanced adhesion as well as an edible product may be used instead of freshwater (e.g. a solution having a basic pH). The kelp if blanched may be allowed to cool at room temperature or may be cooled by being dipped into water (e.g. freshwater or seawater) at about the temperatures mentioned above for the washing treatment (e.g. at about 3 degrees Celsius). The treated (cooled) kelp may than be used more or less right away to make the kelp food product with the washed herring eggs or the kelp may be drained and wrapped in a suitable plastic wrapping material and stored in a chilled room at 0° to 3° C.; it is best to use such stored kelp within about 72 hours or less.

Alternatively, kelp once suitably boiled (i.e. blanched) with, for example, seawater, for about 2 to 3 minutes may subsequently be brine cured for about 30 hours in a saturated brine solution (a 25% salt solution) and then be frozen at, for example, a temperature of −18° C. or lower by any suitable means (e.g. for quality preservation). Prior to use for making the composite food substance, the frozen kelp is defrosted (e.g. to 0° to 3° C. over a 24 hour period) and de-salinated (i.e. treated to remove excess salt) by, for example, being suitably contacted with freshwater. The defrosted kelp may for example be desalinated by being contacted with boiling freshwater for a period of, for example, 2 to 3 minutes. It is necessary to desalinate the kelp in order to re-establish the desired adhesive character of the kelp; the desalination process is of course carried out with a view to preserving the enhanced adhesion characteristic of the kelp.

The above technique may be used in analogous fashion to treat other seafood items as mentioned above such as for example scallop flesh; in the case of meat or flesh type seafood items, however, any blanching should involve a short water contact time so as to avoid undesirable cooking of the meat (e.g. contact may be for a number of seconds e.g. 15 to 25 seconds or less, e.g. 3 seconds or less, e.g. 1 second).

As mentioned above, the loose wet saline washed cohesive herring eggs should be brought into contact with the treated kelp in a relatively short period of time. Thus, for example, within about 5 to 10 minutes or less after the final washing stage, loose washed cohesive herring eggs which are wet (i.e. from which the salt washing liquid has been drained) obtained as described above, may be spread or sprinkled through the air onto the surface of a wet kelp layer a(e.g. a treated kelp layer laid down on a table); the eggs may, for example, be applied in a (thick) egg layer over part or all of the surface of the kelp. It is important to apply wet eggs (e.g. drained of salt solution) on the surface of the kelp. The eggs may for example be at a temperature of about 0° to 10° C. (e.g. at 5° to 10° C.) when spread on or applied to the kelp surface.

The herring eggs (as well as the kelp) may be maintained at a temperature in the range of, for example from 0 degrees Celsius to 30 degrees Celsius during the cohesion step; e.g. at a temperature of 10° to 30° C., e.g. at a temperature of 2° to 15° C., e.g. at a temperature of 19° to 25° C., etc . . . . The egg covered kelp may, thus for example, be allowed to stand (at a room temperature of for example about 30 degrees Celsius or less, e.g. at a temperature of 10° to 30° C., e.g. at a temperature of 2° to 15° C., e.g. at a temperature of 19° to 25° C.) while being exposed to air for an overall time period which may for example range from about 10 minutes to 6 hours or more as the case may be(e.g. 3 to 4 hours), e.g. depending on the thickness of the egg layer and whether or not both sides of the kelp are covered with eggs. The egg coated kelp is left exposed to air so as to obtain a semi or partially dried combination wherein the eggs adequately adhere to the kelp. The exposure of the eggs to air may be enhanced by inducing an air flow over the combination such as for example by means of a fan or the like. The eggs may be for example applied on any one side of the kelp in an egg layer of from 1 mm to 40 mm thick, e.g. 30 mm thick.

When the wet eggs are applied to the surface of the wet kelp and left to set in the presence of air, the eggs tend to adhere to the surface of the kelp as they gradually dry; at the same time individual abutting eggs also adhere to each other.

The eggs may, if desired, to provide a natural looking effect, be applied to the kelp surface in spaced bunches or groups or even as individual spaced apart eggs.

If desired the eggs may be applied to the opposite side of the kelp layer. Thus, when the eggs spread on one side of the kelp become relatively hard and cohesive (for example, after for example 5 to 6 hours or less, e.g. about 1 to 2 hours), the kelp/egg combination may be (gently) turned over, exposing its other side to the air. The same egg spreading or coating process is applied to this other side as well and the combination is left setting for another 1 to 2 hours, exposed to the air. If both sides of the kel are to be egg coverd total air exposure time may thus for example be about 4 to 6 hours.

Air plays an important role in binding wet eggs to the treated kelp. Therefore a mild air flow may help to expedite the adhesion of the eggs to the kelp while maintaining a room temperature of about 19 to 25° C. or lower, e.g. a temperature of about 10 to 15° C. A room temperature higher than 25° C. may possibly be used (e.g. with a increased air flow rate) so as to expedite adhesion of the eggs to the kelp but this may in turn result in spoilage of the eggs if not monitored very carefully. The air may for example have a moisture content such that a hygro meter (moisture indicator) shows a reading of for example from 30 to 90% (e.g. 50 to 60%).

After the passage of a suitable time period for adhering the eggs to the kelp, the kelp and herring eggs adhered thereto, as obtained from the cohesion step may be passed on to a curing step. In any event, care should be taken to avoid freezing the combination obtained from the cohesion step since it has been found that freezing causes the eggs (e.g. egg layer) to separate from the kelp substrate.

Insofar as the curing step is concerned, reference may, for example, be made to Canadian Patent no. 1,099,142 which discloses a method for processing herring eggs by themselves using salt solutions of increasing salt concentration. The processing method disclosed in this patent may comprise 3 to 5 saline soaking stages with the first stage being able to use a salt solution having a salt concentration of about 2%, the final soaking stage using a saturated salt solution (i.e. a 25% salt solution) with any intermediate soaking stage(s) having a salt concentration therebetween. The soaking stages may each be carried out over a time period of for example 20 to 24 hours or more; the overall treatment may be carried out for an overall period of for example 3 days or more (e.g. 3 to 7 days or more). The soaking temperature may be from 3 to 8 degrees Celsius.

Thus, for example, when the kelp with one side or both sides covered with eggs is suitably adhered to the herring eggs (e.g. suitably dry after having been exposed to air for about, for example, 1 to 2 hours for one side or, for example, for about 2 to 4 hours for both sides, at a room temperature of about 19 to 25° C., e.g. 15° C.) the KELP ROE may be gently immersed into seawater (or a 3–5% salt solution) for approximately 12–16 hours which will augment or strengthen the binding of eggs to the surface of the kelp and as the case may be to each other; the salt water may be changed 1 or 2 times during this time period. The KELP ROE may thereafter be immersed in a stronger salt solution (e.g. a 15 to 20% salt solution) for a period of up to 24 hours). This may be followed by immersion in a saturated brine solution (a 25% salt solution) for a further time period of 24 hours or more to finish off the curing of the eggs. The gradual increase in salt strength serves to strengthen egg binding to the kelp and eventually the 25% the salt solution (saturated level) is used to finish off the process of making KELP ROE. It should be noted that increasing the brine strength to strengthen egg binding to the kelp, also causes the eggs to become more cohesive, crunchy and cleaner. Saturated brine is added at the final stage to preserve the quality of KELP ROE, while making KELP ROE adhesive, crunchy and cleaner to the maximum level.

Alternatively, if desired, or, if the thickness of the egg layer on the kelp roe so warrants (e.g. an egg layer thickness of 5 to 10 mm or more on one side of the kelp), the KELP ROE may be put directly into the above mentioned 25% salt solution, i.e. it may be passed directly to a curing treatment using only brine or a salt saturated solution thus by passing the above mentioned intermediate saline soaking stages using saline solution of less the 25% salt.

Thus a process in accordance with the present invention, may include, after the cohesion step, a curing step for the curing (i.e. the preservation) of a coherent mass of herring eggs adhering to kelp wherein the curing step may comprise soaking a KELP ROE coherent mass in a saturated aqueous saline solution for a time period sufficient to obtain a cured coherent mass of herring eggs having a desired degree of crunchiness; the saturated aqueous saline solution is saturated with sodium chloride. The coherent mass of herring eggs obtained from the cohesion step may, for example, be soaked in said saturated sodium chloride solution for a time period of preferably at least 20 hours so as to obtain a product which meets the general market taste (e.g. for a time period of from 20 to 24 hours or more). The curing temperature is, of course, to be chosen with an eye to avoiding damaging the egg product. The curing may, thus, for example, be effected at a temperature of from about 2° C. to about 18° C., (e.g. from about 2° C. to about 15° C.; from about 6° C. to about 15° C.; at about 10 ° C.); the curing may be effected using chilled saturated saline solution.

As may be appreciated from the above, a curing step may thus, for example, generally comprise a single stage curing procedure or a curing procedure which comprises a plurality of such stages. The curing step may, for example, comprise a multi (e.g. three) stage curing procedure with the kelp/egg combination being i) in a first stage, soaked in a 2% to 25% salt solution (e.g. a 17% to 25% salt solution) at a temperature of from 5° to 10° C. and for a time period of from 0 hours to 24 hours;

ii) in a second stage, soaked in a 15% to 25% salt solution solution (e.g. a 22% to 25% salt solution) at a temperature of from 5° to 10° C. and for a time period of from 0 hours to 24 hours; and iii) in a third stage, soaked in a 25% salt solution at a temperature of from 5° to 10° C. and for a time period of from 20 hours to 24 hours.

If only a single curing stage is desired (i.e. wherein for the above stage i) and ii) the time is 0 hours) the kelp/egg combination may be soaked in a 25% salt solution for a longer time period of, for example, from 24 to 72 hours; however, in any event, the soaking time must be sufficient so as to obtain the desired cured product.

It is to be understood herein, that if a "range" or "group of substances" and the like is mentioned with respect to a particular characteristic of the present invention, the present invention relates to and explicitly incorporates herein each and every specific member and combination of sub-ranges or sub-groups therein whatsoever; and each sub-range or sub-group likewise includes each and every specific member and sub-combination of thereof. Thus, any specified range or group is to be understood as a shorthand way of referring to each and every member of a range or group individually as well as each and every possible sub-ranges or sub-groups encompassed therein. For example, with respect to temperature, the mention of the range of 2° C. to 25° C. is to be understood as specifically incorporating herein each and every individual temperature state as well as sub-range, such as, for example, 10° C., 5° C. to 15° C., etc . . . ; similarly with respect to ranges for concentrations, time (e.g. a range of up to 8 hour includes 15 minutes, 5 to 10 minutes, 5 minutes, 1 hour, up to 3 to 4 hours, etc.; a range of up to 3 to 4 hours includes 3 hours, 4 hours, 2.75 hours, 3.5 hours, etc.), etc . . . .

The following example will be directed to the use of frozen herring eggs but it is of course to be understood that apart from the freezing and defrosting stages the procedure described in the example is applicable to fresh herring eggs. It is more practical to produce the KELP ROE from frozen loose eggs block since it is not necessary to depend on herring spawning season for the supply of eggs.

Additionally, in the case of fresh (not defrosted) loose eggs it is relatively speaking more difficult to wash or clean with seawater effectively as compared with defrosted loose eggs

EXAMPLE

Fresh mature herring roe extracted from freshly caught female herring during a spawning season is put into a mechanical mincer (i.e. Bone separator: BAADER Model #694 by BAADER GhbH, Germany) with a screen mesh diameter 1.3–1.5 mm or rubbing the ovaries manually over a wire mesh screen diameter 1.5–2.00 mm.

After fresh loose eggs are obtained therefrom, the eggs are frozen as soon as possible at −40 to −60° C. in a sharp or deep freezer. Any suitable freezer such as mentioned above and which can freeze at −40 to −60° C. in a short period (3–4 hours) may be used; e.g. a Contact freezer manufactured by APV Pafregze, Thetford, England under Model #MC4239) or a CO2 freezer.

It is important that freshly extracted loose eggs be frozen in an unwashed state (i.e. that there be no washing by seawater or freshwater prior to freezing). Any washing may significantly reduce the biological adhesive property of mature eggs.

A) First Day

A frozen block of minced, unwashed loose eggs 9 kgs is defrosted for 24 hours at a room temperature of 7 to 13° C. The block of minced eggs is protected from air by being covered with a poly-sheet or poly-bag during the defrosting period so that the block is not excessively exposed to outside air or airflow directly. A direct contact of eggs with the air for a long period of time (10–24 hours) may not only cause dehydration of the surface eggs but may also cause reduction of the adhesive character of eggs to the kelp. The defrosted loose eggs had a temperature of about from −1 to 1° C. after 24 hours.

Salted kelp scientifically named *Laminaria japonica* is rinsed in freshwater to remove excessive salt used for quality preservation. Then, the rinsed kelp is placed in boiling freshwater (e.g. at 100° C. at sealevel) wherein it is kept for 2–3 minutes or less in order to eliminate or diminish slimy substances from the kelp (surface); the kelp may, if desired, be boiled with seawater instead of freshwater. As noted above the boiling water does not contain any amount of sodium hypochlorite or similar substance which may work to interfere with adhesiveness of the kelp to the eggs. The kelp is then cooled down by being placed in water (e.g. seawater or freshwater) at 3° C. The blanched cooled kelp may be drained and placed wet in a plastic bag for storage in a cooler at, for example, 1 to 3° C. for: 3 to 4 days before use thereof; alternatively, the kelp may be placed in cool freshwater (e.g. at 1 to 3 degrees Celsius) for 10–24 hours prior to use thereof. In any case, prior to use, the kelp is drained to remove excessive water so that a suitable wet kelp can be used for KELP ROE production.

B) Second Day

The eggs were subjected to three saline washing stages.

4.5 kgs of defrosted unwashed loose herring eggs is put into a 12 liter (L) bucket (diameter 29.21 cm with depth 23.50 cm). The loose eggs are well stirred by hand so as to have a loose eggs with a more or less even temperature of about 1° C.

About 8 liters of seawater, free from sodium hypochlorite or other similar sterilization chemicals, is poured in the bucket through a rubber hose the outlet of which is set at the bottom of the bucket; in this manner the action of the seawater entering the bucket agitates the eggs for about 5 seconds. The seawater has a temperature of about 3° C.; the room temperature was about 10° C. Once the bucket is full of seawater, it was left to stand for about 1 minute; during this period the upper (reddish color) and the lower layer (yellowish color) show up distinctly. The upper layer (about 6 liters) is removed gently by decantation by pouring the upper layer off from the top opening of the container leaving the lower layer behind. The same washing process is repeated two times (i.e. for the second wash about 6 liters of seawater was added while after mixing about 6 liters was decanted; for the third wash about 3 liters was added and after mixing about 3 liters was decanted). Excessive washing, (i.e. more than the 3 times using the conditions of this example) will put at risk the adhesive property of the eggs relative to the kelp, i.e. the cohesion character of the eggs may be reduced significantly. The entire washing treatment took about 6 to 10 minutes.

After the third and final washing of the eggs, the remaining salt water was drained from the washed eggs so as to leave wet washed loose cohesive eggs in the bucket; i.e. the loose eggs were in wet state.

Within about 5 minutes of being washed, the wet loose cohesive eggs were spread or sprinkled in a layer onto the upward facing side of the chilled kelp (obtained as described above) so that wet eggs began to set on the surface of the kelp effectively and quickly. The washed eggs applied to the surface of the kelp were allowed to sit for 1 to 2 hours at a room temperature of 15° to 21° C. while being exposed to air. During this time the eggs adhere to the surface of the kelp, while the eggs themselves are bunched up together or piled up high with a thickness in the range of 5–7 mm.

Once the eggs spread on the surface of the kelp sets in and adheres to the kelp, after 1 to 2 hours of air exposure, the kelp is gently turned over to expose the other side to the air so that another layer of washed loose eggs may be applied to it in the same manner as described above.

After another 1 to 2 hours of air exposure, the kelp with eggs on both sides with thickness in the range of 10–14 mm is gently immersed into seawater (3% salt solution), at a temperature of 3° C. overnight at a room temperature of 10° C. (i.e. soaking for about 16 hours). This helps the eggs to adhere to the kelp more firmly while becoming more cohesive, crunchy and cleaner. The seawater may tend to become slightly dirty during seawater immersion periods. Therefore, the seawater may changed one or two times during the 16 hour period.

It is to be understood herein that the salt solution of 3% is a seawater level of salt whereas the 25% salt solution referred to below is a salt solution which is at the saturated level; this is weight % of salt against solution (i.e. solution= weight water+weight salt+. . . ).

C) Third Day

Change the seawater for a salt solution of 20% salt (at 3 to 5 degrees Celsius) and leave it for another 24 hours at a room temperate of 10° C.

E) Fourth Day

Change the 20% salt solution for a salt solution of 25% salt (i.e. a saturated salt solution at 3 to 5 degrees Celsius) and let it stand for a further minimum time period of 24 hours.

This last curing stage enhances the following points:
1. Increase further adhesiveness of eggs to the kelp
2. Make eggs more cohesive
3. Makes eggs more crunchy
4. Preserve the kelp roe quality and shelf-life for a longer period.

After the fourth day store the KELP ROE at 25% brine saturation at −15 to −5° C. but −10° C. is recommended for longer storage.

The KELP ROE drained from 25% saturated solution can be stored at −15 to −5° C. for 1 to 2 months but the shelf-life can be extended considerably if vacuumed properly and stored at −15 to −10° C. Storing at 0 to 2° C. by household freezer is also ideal for a short period of storing (1–2 months).

When measured, original 4.5 kgs of defrosted eggs produced 6.3 kgs of the KELP ROE with both sides covered with layers of eggs ranging 5 to 7 mm in thickness (total thickness is 10–15 mm) but when the edge of the KELP ROE where no kelp extends but a mass of hardened cohesive eggs attached to is trimmed properly, the final weight becomes 5.6 kgs.

As previously mentioned above, the curing step may comprise a single curing stage wherein the kelp/egg combination is immediately placed in a 25% salt solution; in this case the intermediate soakings in unsaturated solutions may be avoided. The above mentioned three stage curing procedure may, for example, be used for egg layers less than 15 mm thick which may require a gentle process whereas a single stage curing procedure may be used for thicker egg layers.

Although one kind of kelp is mentioned in the above example, other different kinds of kelp may work as well in the same way but their boiling period was vary, depending on the kind of kelp or seaweed used.

The present invention has been particularly described above in relation to kelp; however it is applicable not only to kelp and other seaweeds but also to crustaceans and shellfish meat including scallops and surf-clam meat. In these cases the meat may also blanched in order to enhance the adhesion of the eggs to the meat. Thus it is possible to take advantage of the adhesive property of wet mature loose eggs, such that other types of seafoods besides kelp (e.g. other seaweeds, shellfish meat, etc . . . ) can be covered or mixed with eggs.

I claim:

1. A process for the preparation of a composite food substance comprising a layer of an adhesion enhanced kelp and saline washed herring eggs adhered to a surface of the kelp, comprising contacting wet, saline washed, loose, cohesive herring eggs with a wet surface of a layer of an adhesion enhanced pliant kelp having an enhanced capacity for the adherence of said cohesive herring eggs to said surface so as to obtain a kelp/egg combination and subjecting the obtained kelp/egg combination to a cohesion step comprising maintaining the herring eggs in contact with the kelp, while exposing the herring eggs to air, for a time period sufficient to obtain adherence of said eggs to said kelp, wherein said adhesion enhanced kelp has been obtained from a kelp treatment process comprising contacting pliant kelp having a slimy surface with an aqueous de-sliming liquid for a time sufficient so as to obtain an adhesion enhanced kelp having an enhanced capacity for the adherence of said cohesive herring eggs to said surface thereof.

2. A process as defined in claim 1 wherein for the cohesion step the kelp and herring eggs are maintained at a temperature of from 10 to 30 degrees Celsius.

3. A process as defined in claim 1 wherein for the cohesion step the kelp and herring eggs are maintained at a temperature of from 19° to 25° C.

4. A process as defined in claim 1 wherein said aqueous de-sliming liquid is selected from the group consisting of boiling freshwater and boiling seawater.

5. A process as defined in claim 4 wherein the kelp to be treated is contacted for from 2 to 3 minutes with said aqueous de-sliming liquid.

6. A process as defined in claim 1 comprising a saline washing step for treating unwashed loose herring eggs to obtain said loose cohesive herring eggs, said saline washing step comprising contacting loose unwashed herring eggs with an aqueous washing saline solution comprising sodium chloride so as to obtain washed loose cohesive herring eggs, said sodium chloride being present in the washing saline solution at a concentration of from 1% to 6% by weight.

7. A process as defined in claim 6 wherein said saline washing step comprises up to three saline washing stages and wherein for each saline washing stage loose herring egos are washed with said washing saline solution.

8. A process as defined in claim 6 wherein the herring eggs are saline washed at a temperature of from 0° C. to 15° C.

9. A process as defined in claim 6 wherein for the cohesion step the kelp and herring eggs are maintained at a temperature of from 10° C. to 30° C.

10. A process as defined in claim 1 wherein the kelp and herring eggs adhered thereto, as obtained from the cohesion step, are passed on to a curing step for the curing of the eggs adhered to the kelp, said curing step comprising soaking the kelp and herring eggs adhered thereto in an aqueous saline solution saturated with sodium chloride, for a time period sufficient to obtain cured herring eggs, adhering to said kelp.

11. A process as defined in claim 10 wherein said curing step comprises one or more intermediate curing stages prior to soaking the kelp and herring eggs with said saturated saline solution, said one or more intermediate curing stages each comprising soaking the kelp and herring eggs adhered thereto in an unsaturated aqueous saline solution comprising sodium chloride at a concentration of at least 2% by weight.

12. A process as defined in claim 6, said process comprising, prior to the saline washing step, a quick freezing step wherein unwashed herring eggs are brought to a freezing temperature of −30° C. or lower, the frozen eggs being defrosted prior to being subjected to the saline washing step.

13. A process as defined in claim 12 wherein the frozen eggs are defrosted to a temperature of from −5° to −1° C. prior to being subjected to the saline washing step.

14. A process as defined in claim 13 wherein the herring eggs are saline washed at a temperature of from 0° C. to 5° C.

15. A process as defined in claim 14 wherein for the cohesion step the kelp and herring eggs are maintained at a temperature of from 19° C. to 25° C.

16. A process as defined in claim 1 comprising a) a saline washing step for treating unwashed loose herring eggs to obtain said loose cohesive herring eggs, b) a freezing step, prior to the saline washing step, wherein unwashed herring eggs are brought to a freezing temperature of −30° or less, the frozen eggs being defrosted prior to being subjected to the saline washing step and c) wherein the kelp and herring eggs adhered thereto, as obtained from the cohesion step, are passed on to a curing step for the curing of the eggs adhered to the kelp, said saline washing step comprising contacting loose unwashed herring eggs with an aqueous washing saline solution comprising sodium chloride so as to obtain washed loose cohesive herring eggs, said sodium chloride being present in the washing saline solution at a concentration of from 1% to 6% by weight, said curing step comprising soaking the kelp and herring eggs adhered thereto in an aqueous saline solution saturated with sodium chloride, for a time period sufficient to obtain cured herring eggs, adhering to said kelp wherein the frozen eggs are defrosted to a temperature of from $-5°$ to $-1°$ C. prior to being subjected to the saline washing step wherein the herring eggs are saline washed at a temperature of from $0°$ C. to $5°$ C.

wherein for the cohesion step the kelp and herring eggs are maintained at a temperature of from $19°$ to $25°$ C.

17. A process as defined in claim 16 wherein said saline washing step comprises up to three saline washing stages and wherein for each saline washing stage loose herring eggs are washed with said washing saline solution, wherein said curing step comprises one or more intermediate curing stages prior to soaking the kelp and herring eggs with said saturated saline solution, said one or more intermediate curing stages each comprising soaking the kelp and herring eggs adhered thereto in an unsaturated aqueous saline solution comprising sodium chloride at a concentration of at least 2% by weight.

18. A process as defined in claim 17 comprising a kelp treatment step for treating kelp to obtain said adhesion enhanced kelp, said kelp treatment step comprising contacting pliant kelp having a slimy surface with an aqueous de-sliming liquid for a time sufficient so as to obtain an adhesion enhanced kelp having an enhanced capacity for the adherence of said cohesive herring eggs to said surface thereof, wherein said aqueous de-sliming liquid is selected from the group consisting of boiling freshwater and boiling seawater and wherein the kelp to be treated is contacted for from 2 to 3 minutes with said aqueous de-sliming liquid.

19. A process as defined in claim 18 wherein for said quick freezing step the unwashed herring eggs are brought to a freezing temperature of from $-30°$ C. to $-60°$ C.

20. A process as defined in claim 6 wherein said aqueous washing saline solution comprises seawater.

21. A process as defined in claim 7 wherein said aqueous washing saline solution comprises seawater.

22. A process as defined in claim 8 wherein said aqueous washing saline solution comprises seawater.

23. A process as defined in claim 9 wherein said aqueous washing saline solution comprises seawater.

24. A process as defined in claim 16 wherein said aqueous washing saline solution comprises seawater.

25. A process as defined in claim 17 wherein said aqueous washing saline solution comprises seawater.

26. A process as defined in claim 18 wherein said aqueous washing saline solution comprises seawater.

27. A process as defined in claim 19 wherein said aqueous washing saline solution comprises seawater.

* * * * *